United States Patent [19]

Schmucki

[11] 4,207,767
[45] Jun. 17, 1980

[54] THERMOSTATIC EXPANSIBLE WORK ELEMENT

[75] Inventor: Josef Schmucki, Gossau, Switzerland

[73] Assignee: Elektrowatt AG, Zürich, Switzerland

[21] Appl. No.: 5,295

[22] Filed: Jan. 22, 1979

[30] Foreign Application Priority Data

Mar. 2, 1978 [CH] Switzerland .............. 1185/78

[51] Int. Cl.² .................................... G01K 5/48
[52] U.S. Cl. ........................ 73/363; 60/527; 73/368.3
[58] Field of Search .............. 73/363, 368, 368.4, 73/368.3; 60/527, 528, 530

[56] References Cited

U.S. PATENT DOCUMENTS

| 3,075,348 | 1/1963 | Baker ................................ 60/528 |
| 3,968,392 | 7/1976 | Blättler ............................. 73/363 |

FOREIGN PATENT DOCUMENTS

| 917122 | 12/1972 | Canada ................................ 60/527 |
| 1473231 | 12/1969 | Fed. Rep. of Germany ......... 73/368.3 |

Primary Examiner—Gerald Goldberg
Assistant Examiner—Denis E. Corr
Attorney, Agent, or Firm—Werner W. Kleeman

[57] ABSTRACT

A thermostatic expansible work element comprising a housing within which there is enclosed an expansible body. In the expansible body there extends the one pointed end of a work member in the form of a work pin or piston, the other end of which extends through an opening out of the housing. Between the opening and the end face of the expansible body which confronts such opening there is arranged a ring-shaped or annular disk which surrounds with a sliding fit the work pin or piston. The ring-shaped disk covers an annular space or gap between the opening and the outer diameter of the work pin or piston, so that the latter, during its displacement or stroke, also can be deflected out of its original axial direction without binding in the opening. The thermostatic expansible work element also can be externally heated so as to serve as a servo for remote actuation of an element, for instance valves.

12 Claims, 2 Drawing Figures

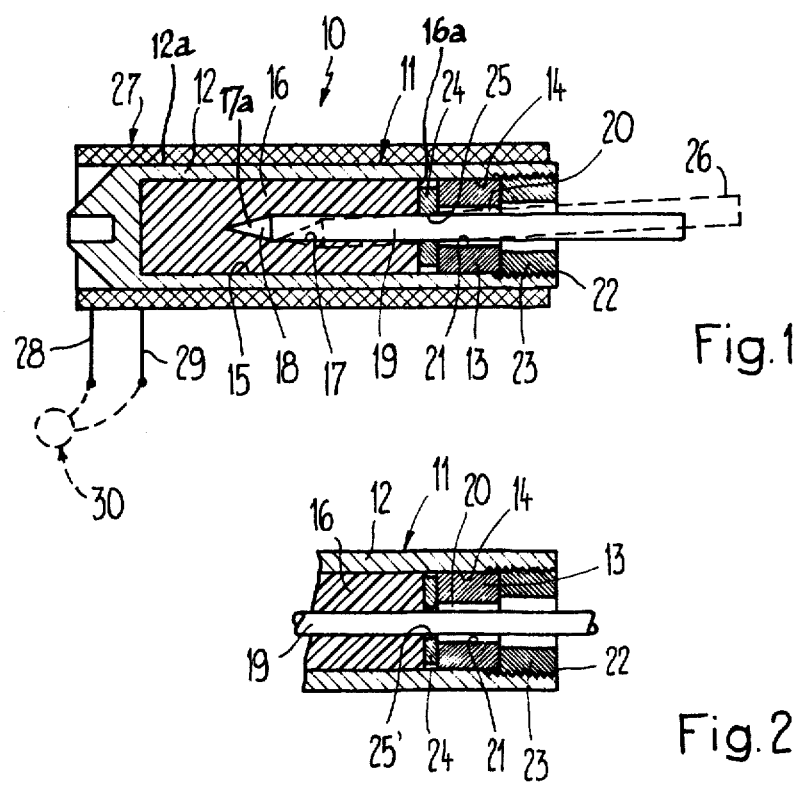

THERMOSTATIC EXPANSIBLE WORK ELEMENT

BACKGROUND OF THE INVENTION

The present invention relates to a new and improved construction of a thermostatic expansible work element—also sometimes referred to in the art as a thermostatic expansible material-working element—, which is of the type comprising an expansible body formed of plastic and enclosed in a housing and equipped with a work pin or the like which is pointed at one end, the work pin displaceably extending through an opening in the housing and with its pointed end protruding into a bore in the expansible body. The work pin, during thermal expansion of the expansible body, being forced out of the latter.

Such type thermostatic expansible work element has been disclosed for instance in the German patent publication 2,461,041 and the corresponding U.S. Pat. No. 3,968,692, granted July 13, 1976. With this heretofore known and competent thermostatic expansible work element the expansible body is formed for instance of polytetrafluoroethylene (PTFE), i.e., from a basically solid plastic which does not transform into the liquid phase even at the operating temperatures at which the work element should respond. Furthermore, the thermal expansion of the expansible body enclosed in the housing produces such a compressive load that the expansible body behaves in a plastic manner and, owing to the absence of any other expansion possibilities, forces the work pin out of the expansible body.

Of course this plastic behavior of the expansible body does not proceed to such an extent that such would flow out of the annular gap between the work pin and the inner wall of the opening in the housing, although here, of necessity, thee must be provided a certain play which is capable of permitting the displacement movement of the work pin. With sufficient length of the opening of the housing it is even possible to have the work pin extend without any seal through the opening.

The apparent advantages of the heretofore known thermostatic expansible work element can only be completely realized in practice if the bore provided in the expansible body, into which there extends the pointed end of the work pin, is exactly centrally arranged and furthermore is exactly aligned with the opening in the housing. If this is not so then the work pin, during the expansion of the expansible body, not only will be axially displaced, but also is exposed to a radial force, with the result that the work pin tends to bind or clamp in the opening. The result of this phenomenon is that the temperature-displacement characteristic curve of the thermostatic expansible work element is at least falsified in that the stroke or displacement of the work pin within the response region of the thermostatic expansible work element is not always the same for the same temperature changes.

SUMMARY OF THE INVENTION

Therefore, with the foregoing in mind it is a primary object of the present invention to provide an improved construction of thermostatic expansible work element which is not associated with the aforementioned drawbacks and limitations of the prior art constructions discussed above.

It is another and more specific object of the present invention to provide a new and improved construction of thermostatic expansible work element of the previously mentioned type wherein there are permissible additional manufacturing tolerances without there arising, during operation, binding or clamping of the work pin or the like in the opening of the housing.

Now in order to implement these and still further objects of the invention, which will become more readily apparent as the description proceeds, the proposed thermostatic expansible work element according to the invention is manifested by the features that the work member, typically in the form of a work pin or piston, is surrounded between the expansible body and the opening of the housing by a substantially ring-shaped disk which is seated with a sliding fit upon such work member. This ring-shaped or annular disk bridges a ring-shaped gap between the outer diameter of the work member and the inner diameter of the opening.

By virtue of this construction the inner diameter of the opening can be selected to be appreciably larger. Consequently, there is not only insured for an axial displaceability but also a limited wobbling motion of the work member, i.e., the work pin or piston, without there existing the danger that the material of the expansible body, also in the presence of extreme internal pressures, will flow through the ring-shaped or annular gap. The thickness of the ring-shaped disk is advantageously chosen so that at most it is the same size as the internal diameter of its bore which receives the work member. According to a particular embodiment of the invention the bore provided in the ring-shaped disk also can have a crowned or dome-shaped profile or configuration.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a longitudinal sectional view through a thermostatic expansible work element constructed according to the invention; and FIG. 2 is a fragmentary longitudinal sectional view through part of a modified embodiment of thermostatic expansible work element.

DETAILED DESCRIPTION OF THE PREFERRED EMBODIMENTS

Describing now the drawings, the thermostatic expansible work element 10 illustrated therein will be seen to comprise a housing 11 which, in turn, is essentially composed of a sleeve 12 closed at one end and a closure bushing 13 which closes the open end 14 of such sleeve 12. Within a space or chamber 15 surrounded by the sleeve 12 and the closure bushing 13 there is arranged an expansible body 16, for instances formed of a polymerized fluorinated hydrocarbon, such as PTFE. The expansible body 16 is provided with a blindhole bore 17 having a pointed bore end 17a. Extending within the blindhole bore 17 is a pointed end 18 of a work member, here shown as an essentially cylindrical work pin or piston 19. This work pin or piston 19, while leaving free an annular or ring-shaped gap 20, extends through a bore or opening 21 in the closure bushing or sleeve 13 and protrudes out of the housing 11, as best seen by referring to FIG. 1.

The closure bushing or sleeve 13 is biased or pressed against the expansible body 16 by means of a bored-through threaded plug or stopper 23 through which there likewise extends the work pin or piston 19. The threaded plug 23 is threaded into the internal threading 22 provided at the region of the open end 14 of the sleeve 12. Between the opening 21 and the end face 16a of the expansible body 16 which confronts the opening 21 the work pin or piston 19 is surrounded by a ring-shaped or annular disk 24. This ring-shaped disk 24 is seated upon the work pin or piston 19 with a sliding fit, in other words without any appreciable play. The outer diameter of the substantially ring-shaped disk 24 is smaller than the inner diameter of the internal space or chamber 15. The ring-shaped disk 24 is provided with a bore 25 which, in relation to the work pin or piston 19, possesses a play which just allows for an axial displacement of the work pin or piston 19. The ring-shaped disk 24 thus covers or spans the inner end of the ring-shaped gap or space 20 and additionally is displaceable transversely with respect to the direction of displacement or stroke of the work pin or piston 19.

The ring-shaped disk 24 thus, on the one hand, renders possible selecting the diameter of the opening or bore 21 to be so large that there is prevented any binding of the work pin or piston 19 which possibly has not been displaced in purely axial direction, by virtue of any existing manufacturing inaccuracies, and, on the other hand, "seals" the ring-shaped gap 20, which has become wider due to enlargement of the opening 21, towards the expansible body 16, so that the material thereof, even in the presence of extreme pressure conditions, cannot flow away through such ring-shaped gap 20. Finally, the ring-shaped disk 24 also transmits the pressure which emanates from the threaded plug or stopper 23 to the expansible body 16, so that such, already during the assembly or in the cold condition, can be deformed to such an extent that practically there are not present any air inclusions.

During thermal expansion of the expansible body 16 the pin or piston 19 is displaced out of the expansible body 16. Now if this displacement, as mentioned, does not occur in purely axial direction of the pin 19 or the like, the latter does not tend to bind in the opening 21, rather is capable of altering its axial position during the course of its axial displacement or stroke, as the same has been shown in markedly exaggerated fashion by the broken lines 26. It is however to be observed that these movements or deflections which occur transversely with respect to the axial or displacement direction of the work pin or piston 19 are always quite appreciably smaller in relation to the movement in axial direction.

The thermostatic expansible work element 10 illustrated in FIG. 1 is intended for use as a linear servomotor, for instance for actuating a not particularly illustrated valve by means of the work pin or piston 19 or some other suitable work member. For this purpose the outside or outer surface 12a of the sleeve 12 has wound thereon a suitable electrical heating winding or coil 27 which can be connected by means of the terminals 28 and 29 and a control element 30 with a suitable heating potential or voltage. The stroke or displacement of the work pin or piston 19 therefore is always dependent upon, within certain limits, the amplitude of the heating voltage.

The embodiment of FIG. 2, wherein generally the same reference characters have been used as in FIG. 1 for the same or analogous elements, differs from the embodiment of FIG. 1 essentially by virtue of the fact that here the thickness of the ring-shaped or the annular disk 24 is appreciably smaller than the diameter of the work pin or piston 19 and that its bore 25' has a crowned or domed longitudinal profile or configuration, whereby there is not only possible a displacement but also a deflection of the axis of the work pin or piston 19. In this case the ring-shaped disk 24, as shown in the upper half of the showing of FIG. 2, also can have an external diameter which almost corresponds to the inner diameter of the open end 14 of the sleeve 12.

While there are shown and described present preferred embodiments of the invention, it is to be distinctly understood that the invention is not limited thereto, but may be otherwise variously embodied and practiced within the scope of the following claims. Accordingly.

What I claim is:

1. A thermostatic expansible work element comprising:
    a housing;
    an expansible body formed of plastic enclosed in said housing;
    said housing being provided with an opening;
    a work member having a pointed end extending with play through said opening of the housing;
    said expansible body having a bore for snugly receiving the pointed end of said work member;
    said work member, during thermal expansion of the expansible body, being displaced out of the expansible body;
    a substantially ring-shaped disk arranged between the expansible body and said opening of the housing;
    said ring-shaped disk being interposed between said expansible body and said opening of the housing and being seated upon said work member with a sliding fit; and
    said ring-shaped disk bridging the play between the outer diameter of the work member and the inner diameter of the opening.

2. The thermostatic expansible work element as defined in claim 1, wherein:
    said work member comprises a work pin.

3. The thermostatic expansible work element as defined in claim 1, wherein:
    said work member comprises a work piston.

4. The thermostatic expansible work element as defined in claim 1, wherein:
    said ring-shaped disk is substantially flat.

5. The thermostatic expansible work element as defined in claim 1, wherein:
    the thickness of the ring-shaped disk at most is equal to the outer diameter of the work member.

6. The thermostatic expansible work element as defined in claim 1, wherein:
    the thickness of the ring-shaped disk is less than the outer diameter of the work member.

7. The thermostatic expansible work element as defined in claim 1, wherein:
    said ring-shaped disk is substantially flat.

8. The thermostatic expansible work element as defined in claim 1, wherein:
    said ring-shaped disk has a bore surrounding the work member; and
    said bore of said ring-shaped disk having a domed longitudinal configuration.

9. A thermostatic expansible work element comprising: a housing;
    an expansible body formed of plastic enclosed in said housing;
    said housing being provided with an opening;

a work member having a pointed end extending displaceably through said opening of the housing;

said expansible body having a bore for receiving the pointed end of said work member;

said work member, during thermal expansion of the expansible body, being displaced out of the expansible body;

a substantially ring-shaped disk arranged between the expansible body and said opening of the housing;

said ring-shaped disk surrounding the work member between said expansible body and said opening of the housing and being seated upon said work member with a sliding fit; and said ring-shaped disk bridging a ring-shaped gap between the outer diameter of the work member and the inner diameter of the opening, wherein said substantially ring-shaped disk is arranged for displacement transversely with respect to the direction of displacement of the work member.

10. The thermostatic expansible work element as defined in claim 9, wherein:

the thickness of the ring-shaped disk is at most equal to the outer diameter of the work member.

11. The thermostatic expansible work element as defined in claim 9, wherein:

the thickness of the ring-shaped disk is less than the outer diameter of the work member.

12. The thermostatic expansible work element as defined in claim 10, wherein:

said ring-shaped disk has a bore surrounding the work member; and said bore of said ring-shaped disk having a domed longitudinal configuration.

* * * * *